United States Patent
Duval et al.

(10) Patent No.: US 12,478,438 B2
(45) Date of Patent: Nov. 25, 2025

(54) SYSTEMS AND METHODS FOR UTILIZING ARTIFICIAL INTELLIGENCE TO GUIDE A MEDICAL DEVICE

(71) Applicant: Boston Scientific Scimed, Inc., Maple Grove, MN (US)

(72) Inventors: George Duval, Sudbury, MA (US); James Weldon, Newton, MA (US); Elizabeth Albrecht, White Bear Lake, MN (US); Megan Chrobak, Westford, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 104 days.

(21) Appl. No.: 18/349,344

(22) Filed: Jul. 10, 2023

(65) Prior Publication Data
US 2024/0016551 A1 Jan. 18, 2024

Related U.S. Application Data

(60) Provisional application No. 63/368,529, filed on Jul. 15, 2022.

(51) Int. Cl.
*A61B 34/20* (2016.01)
*A61B 34/10* (2016.01)
*G06T 7/00* (2017.01)

(52) U.S. Cl.
CPC .............. *A61B 34/20* (2016.02); *A61B 34/10* (2016.02); *G06T 7/00* (2013.01);
(Continued)

(58) Field of Classification Search
CPC ... A61B 34/20; A61B 34/10; A61B 2034/107; A61B 2034/2051; A61B 2034/2065;
(Continued)

(56) References Cited

U.S. PATENT DOCUMENTS

| | | | |
|---|---|---|---|
| 2020/0315572 A1* | 10/2020 | Salgaonkar | A61B 5/061 |
| 2021/0161361 A1* | 6/2021 | Flanagan | A61B 1/0057 |
| 2021/0177524 A1* | 6/2021 | Thienphrapa | A61B 1/00045 |
| 2021/0287395 A1 | 9/2021 | Ishikake et al. | |
| 2021/0307841 A1 | 10/2021 | Buch et al. | |

(Continued)

OTHER PUBLICATIONS

Watanabe et al., "Transpapillary biliary cannulation is difficult in cases with large oral protrusion of the duodenal papilla," Dig. Dis. Sci. 64, 2291-2299 (2019), Fig. 2 retrieved from https://www.researchgate.net/figure/Papilla-pattern-according-to-our-classification-The-papilla-pattern-is-classified-into_fig2_331040166.

*Primary Examiner* — Sean D Mattson
(74) *Attorney, Agent, or Firm* — Bookoff McAndrews, PLLC

(57) ABSTRACT

Systems and methods for generating navigational guidance for a medical device within a body are disclosed. One computer-implemented method may include: receiving, at a computer server, image data associated with at least one anatomical object; determining, using a processor associated with the computer server and via application of a trained predictive navigational guidance model to the image data, navigational guidance for the medical device in relation to the at least one anatomical object; generating, based on the determining, at least one visual representation associated with the navigational guidance; and transmitting, to a user device in network communication with the computer server, instructions to display the at least one visual representation associated with the navigational guidance overtop of the image data on a display screen of the user device.

20 Claims, 10 Drawing Sheets

(52) U.S. Cl.
CPC . *A61B 2034/107* (2016.02); *A61B 2034/2051* (2016.02); *A61B 2034/2065* (2016.02); *G06T 2207/30004* (2013.01)

(58) Field of Classification Search
CPC ...... A61B 2034/256; A61B 2034/2048; A61B 2034/2061; A61B 2034/2063; A61B 90/361; G06T 7/00; G06T 2207/30004; G06V 2201/034; G06V 10/82; G16H 30/20; G16H 30/40; G16H 20/40; G16H 40/67; G16H 50/20; G16H 50/70; G06N 20/00
See application file for complete search history.

(56) References Cited

U.S. PATENT DOCUMENTS

| | | | |
|---|---|---|---|
| 2021/0330397 A1 | 10/2021 | Regensburger | |
| 2021/0378484 A1 | 12/2021 | Ninh et al. | |
| 2021/0405344 A1 | 12/2021 | Tojo | |
| 2022/0046292 A1 | 2/2022 | Nair et al. | |
| 2022/0084194 A1 | 3/2022 | Kawabata | |
| 2022/0346637 A1* | 11/2022 | Yeung | A61B 1/00098 |
| 2022/0401155 A1* | 12/2022 | Regensburger | A61N 7/02 |
| 2023/0123739 A1* | 4/2023 | Mino | A61B 34/20 |
| | | | 600/424 |
| 2023/0153288 A1* | 5/2023 | Gono | G16H 40/20 |
| | | | 707/822 |

* cited by examiner

SYSTEMS AND METHODS FOR UTILIZING ARTIFICIAL INTELLIGENCE TO GUIDE A MEDICAL DEVICE

CROSS-REFERENCE TO RELATED APPLICATIONS

This application claims the benefit of priority of U.S. Provisional Application No. 63/368,529, filed Jul. 15, 2022, which is incorporated by reference herein in its entirety.

TECHNICAL FIELD

Various aspects of this disclosure relate generally to systems and methods for utilizing artificial intelligence to provide navigational guidance for a medical device performing actions within a body. More specifically, in embodiments, this disclosure relates to the application of a trained machine learning model to data associated with providing predictive navigational guidance for a physician operating a medical device.

BACKGROUND

Certain medical procedures may be performed to examine and treat issues internal to the body. For example, during an endoscopic procedure, a long, thin tube is inserted directly into the body to observe an internal organ or tissue in detail. Such a procedure may also be used to carry out other tasks, including imaging and minor surgery. In some endoscopic procedures, cannulation of various anatomical objects (e.g., one or more ducts, etc.) may need to be achieved via insertion of an endoscopic component (e.g., a guidewire). Such a maneuver may be very challenging and may carry with it a steep learning curve. Consequently, the time for a novice physician to become proficient with such a procedure may be very long.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

Each of the aspects disclosed herein may include one or more of the features described in connection with any of the other disclosed aspects.

Aspects of the disclosure relate to, among other things, systems and methods for generating navigational guidance for a medical device operating within a body. According to an example, a computer-implemented method is provided for generating navigational guidance for a medical device within a body. The computer-implemented method, including: receiving, at a computer server, image data associated with at least one anatomical object; determining, using a processor associated with the computer server and via application of a trained predictive navigational guidance model to the image data, navigational guidance for the medical device in relation to the at least one anatomical object; generating, based on the determining, at least one visual representation associated with the navigational guidance; and transmitting, to a user device in network communication with the computer server, instructions to display the at least one visual representation associated with the navigational guidance overtop of the image data on a display screen of the user device.

Any of the computer-implemented methods for generating navigational guidance may include any of the following features and/or processes. The medical device may be an endoscope having an extendable guide wire. The at least one anatomical objet may correspond to one or more of: a papilla, an orifice, and/or an internal duct. The navigational guidance may include a path for the medical device for cannulation of the anatomical object. The image data may be captured by at least one sensor associated with the medical device and/or by at least one other imaging device. The at least one sensor may contain a camera sensor and image data captured by the camera sensor may include at least one: shape data, orientation data, and/or appearance data of the at least one anatomical object. The at least one other imaging device may contain an X-ray device and/or an ultrasound device and the image data captured by the at least one other imaging device may include anatomical structure data. One or more other sensors may be utilized, including at least one of: an electromagnetic sensor, an accelerometer, a gyroscope, a fiber optic sensor, an ultrasound transducer, a capacitive position sensor, and/or an inductive position sensor. The one or more other sensors may capture position data associated with the medical device. The determination of the navigational guidance may include identifying anatomical feature data from the image data using the predictive navigational guidance model. The identification of the anatomical feature data may include: identifying a first classification associated with a first anatomical object within a first target region of the image data; identifying a second classification associated with a second anatomical object from within a second target region bounded by the first target region; detecting a location of one or more third anatomical objects from within the second target region; and detecting one or more other anatomical objects associated with the first anatomical object. The determination of the navigational guidance for the medical device may include: identifying a confidence weight held by the predictive navigational guidance model for the at least one anatomical object; and determining whether that confidence weight is greater than a predetermined confidence threshold; wherein the generation of the navigational guidance is only performed in response to determining that the confidence weight is greater than the predetermined confidence threshold. The at least one visual representation may include one or more of: at least one trajectory overlay, at least one annotation, and/or at least one feedback notification. The at least one trajectory overlay may include a visual indication, overlaid on top of an image of the at least one anatomical object, of a projected path to an access point of the at least one anatomical object that a component of the medical device may follow to cannulate the at least one anatomical object. The computer-implemented method may also receive position data for the medical device and identify deviation of the medical device from the projected path based on analysis of the position data. The generation of the feedback notification in this situation may be responsive to the detection that the deviation of the medical device from the projected path is greater than a predetermined amount. The at least one annotation may include one or more visual indications, overlaid on top of an image of the at least one anatomical object, indicating predetermined features associated with the at least one anatomical object. The one or more visual indications may include one or more of: a color indication, an outline indication, and/or a text-based indication.

According to another example, a computer-implemented method of training a predictive navigational guidance model is provided. The computer-implemented method, including: receiving, from a database, a training dataset comprising historical medical procedure data associated with a plurality of completed medical procedures; extracting, from image data in the training dataset, anatomical feature data; extracting, from sensor data in the training dataset, medical device positioning data; extracting, from the training dataset, procedure outcome data; and utilizing the extracted anatomical feature data, the extracted medical device positioning data, and the extracted procedure outcome data to train the predictive navigational guidance model.

Any of the computer-implemented methods for training a predictive navigational guidance model may include any of the following features and/or processes. The training dataset may be annotated with identification data. The extraction of the anatomical feature data may include: identifying a classification associated with a first anatomical object; determining an identity of a second anatomical object from within a second target region bounded by the first target region in the image data; detecting at least one location associated with one or more third anatomical objects; and detecting one or more other anatomical objects associated with the first anatomical object. The computer-implemented method may also identify a new procedural outcome and update the database with data associated with the new procedural outcome.

According to another example, a computer system for generating navigational guidance for a medical device within a body, the computer system includes: at least one memory storing instructions; at least one processor configured to execute the instructions to perform operations comprising: receiving image data associated with at least one anatomical object; determining, using the at least one processor and via application of a trained predictive navigational guidance model to the image data, navigational guidance for the medical device in relation to the at least one anatomical object; generating, based on the determining, at least one visual representation associated with the navigational guidance; and transmitting, to a user device, instructions to display the at least one visual representation associated with the navigational guidance overtop of the image data on a display screen of the user device It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate aspects of this disclosure and together with the description, serve to explain the principles of the disclosure.

Figure 1:
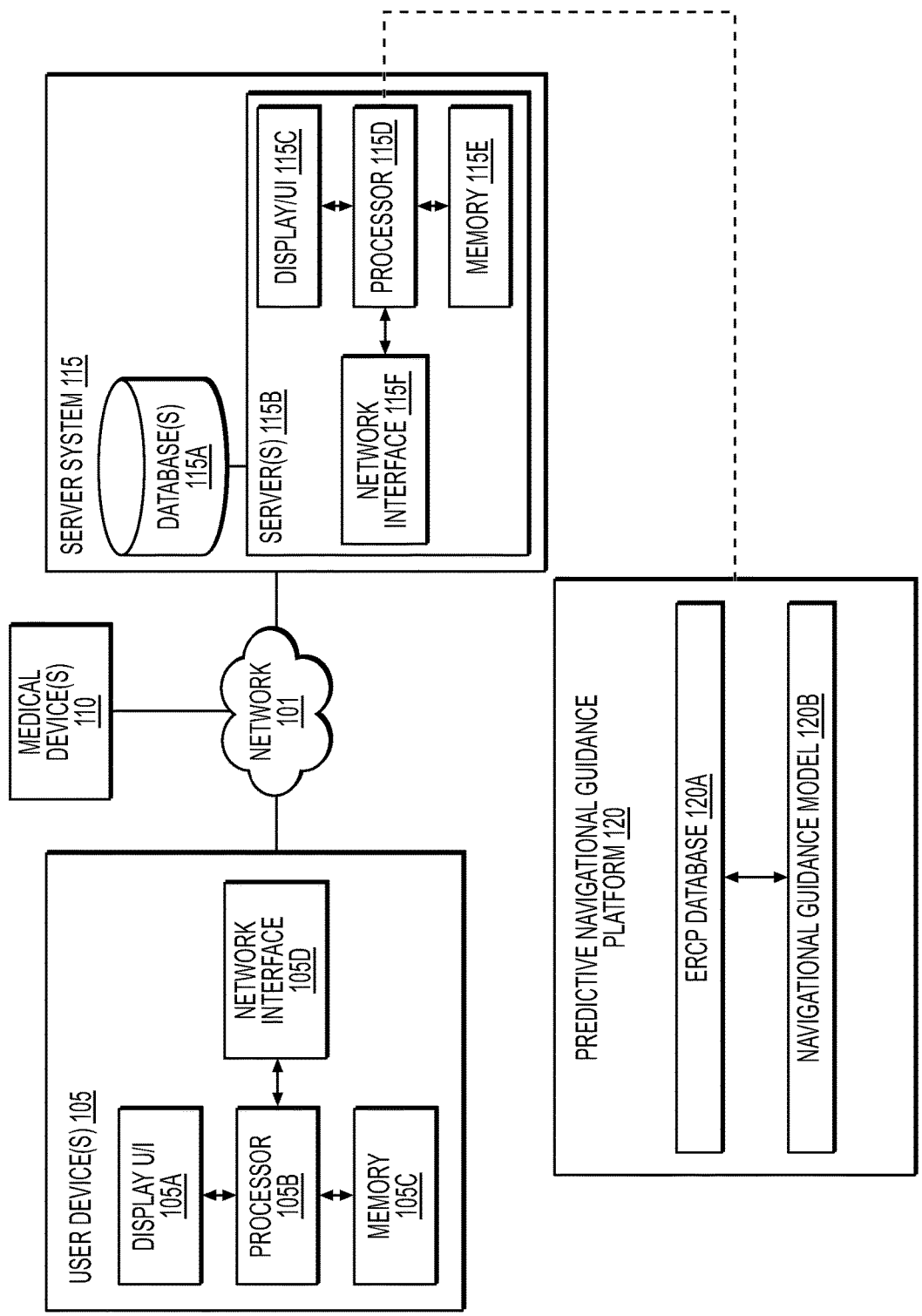
FIG. 1 depicts an exemplary environment for training and/or utilizing a machine-learning model to apply to medical procedure data to generate predictive navigational guidance, according to one or more embodiments.

It is to be that both the foregoing general description and the following detailed description are exemplary and explanatory only and are not restrictive of the disclosed embodiments, as claimed.

DETAILED DESCRIPTION

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "diameter" may refer to a width where an element is not circular. The term "top" refers to a direction or side of a device relative to its orientation during use, and the term "bottom" refers to a direction or side of a device relative to its orientation during use that is opposite of the "top." The term "exemplary" is used in the sense of "example," rather than "ideal." Relative terms, such as, "substantially" and "generally," are used to indicate a possible variation of +10% of a stated or understood value.

Reference to any particular procedure is provided in this disclosure only for convenience and not intended to limit the disclosure. A person of ordinary skill in the art would recognize that the concepts underlying the disclosed devices and methods may be utilized in any suitable procedure. For ease of description, portions of the device and/or its components are referred to as proximal and distal portions. It should be noted that the term "proximal" is intended to refer to portions closer to a user of the device, and the term "distal" is used herein to refer to portions further away from the user. Similarly, extends "distally" indicates that a component extends in a distal direction, and extends "proximally" indicates that a component extends in a proximal direction.

In the following description, embodiments will be described with reference to the accompanying drawings. As will be discussed in more detail below, according to certain aspects of the disclosure, methods and systems are disclosed for capturing information associated with one or more biological components using a medical device (e.g., during a medical procedure), comparing the captured information against a database of historical procedural data or applying a model trained on historical procedural data to the captured information, and thereafter providing various types of guidance based on the results of the comparison and/or analysis.

Endoscopic Retrograde Choloangio-Panceatography (ERCP) is a procedure conventionally utilized to examine the biliary duct. In the procedure, an endoscope is inserted through the mouth and is passed to the duodenum. The duodenum is then insufflated and the entry point for the common duct for the biliary and pancreatic ducts is identified. A tome may be used to perform a sphincterotomy to widen the opening, thereby making cannulation easier to perform. A guidewide may then be used to enter into the common duct, and is maneuvered to the biliary duct. Once duct cannulation has been achieved, a cholangioscope may be inserted over the guidewire and into the duct. Contrast may then be injected and used in combination with X-rays to identify regions of interest. The physician may thereafter perform a variety of procedures such as stone management or therapy of biliary malignancies.

Conventionally, cannulation of the proper duct can be very challenging for a variety of reasons. For example, the ergonomics of manipulating an 8-degree-of-freedom endoscope to enter into a precise location can be difficult, even for an experienced and practiced physician. Additionally, as another example, the lack of visualization of the duct pathway beyond the common entry point may exacerbate the difficulty of the task. More particularly, although various types of visualizations of a target area are available to a physician during the ERCP procedure (e.g., pre-operative magnetic resonance cholangio-pancreatography (MRCP), post-cannulation high resolution imaging, X-rays, pre-operative CT scans, etc.), only direct visualization is utilized (i.e., as provided by the endoscope) for the cannulation process specifically. This limited visualization provides no information regarding the anatomy of the ducts beyond the common entry point, which is especially problematic because the anatomical architecture of the ducts is patient specific (i.e., the characteristics of every single papilla through which the guidewire needs to enter is different). Consequently, in view of the aforementioned challenges, a common procedural result is disturbance of the pancreatic duct (e.g., via misplacement of the guidewire by the physician, etc.). In more serious cases, this disturbance may lead to pancreatitis.

The high degree of inherent difficulty operating the endoscope, coupled with the lack of proper visualization during cannulation, results in a steep learning curve for physicians attempting to attain proficiency in conducting ERCP procedures. Furthermore, even after becoming proficient, physicians need to continually perform these types of procedures to maintain their level of skill (e.g., at least one ERCP procedure a week), which may be very demanding, burdensome, and/or not feasible (e.g., a physician may not be located in an area where a high volume of ERCP procedures are performed, etc.). Accordingly, a need exists for the ERCP procedure to be simplified, or modified, to enable more physicians to master the procedure in a shorter period of time, which may potentially lead to better patient care.

As will be discussed in more detail below, the present disclosure provides a platform that may provide dynamic guidance to a physician during a procedure such as an ERCP procedure by applying a predictive navigational guidance model (i.e., trained from historical procedure-related data stored in an accessible ERCP database) to data obtained and associated with a live medical procedure. More particularly, anatomical feature data (e.g., characteristics of a target papilla and/or the anatomy of the relevant ducts) may be extracted from image data initially captured using one or more sensors (e.g., camera/video sensors, etc.) associated with an endoscope and/or one or more other imaging modalities (e.g., fluoroscopy, ultrasound, etc.). Additionally, in some embodiments, medical device position data (e.g., the position, angle, and/or movements of a medical device with respect to a target anatomical object) may be captured using one or more other sensors (e.g., electromagnetic sensors, etc.). The accumulated live procedure data may then be submitted as input to the predictive navigational guidance model, which may then analyze the data to determine navigational guidance for maneuvering of a guidewire of an endoscope through an appropriate orifice of a papilla. This guidance may be transmitted to a user device (e.g., a computing device integrally or operatively coupled to the endoscope, etc.) and may manifest as one or more visual indications (e.g., recommended cannulation trajectories, annotations, notifications, etc.) that may be overlaid atop the live procedural image data to aid physicians in the completion of the procedure.

It is important to note that although the techniques utilized herein are described with explicit reference to an ERCP procedure, such a designation is not limiting. More particularly, the machine-learning model described herein may be trained to identify characteristic features associated with other anatomical objects/structures and may correspondingly be utilized to provide guidance for other types of medical procedures.

FIG. 1 depicts an exemplary environment 100 that may be utilized with the techniques presented herein. One or more user device(s) 105 may communicate with one or more medical devices 110 and/or one or more server system(s) 115 across a network 101. The one or more user device(s) 105 may be associated with a user, e.g., a user associated with one or more of generating, training, using, or tuning a machine-learning model for providing predictive navigational guidance during a medical procedure. For example, the one or more user device(s) 105 may be associated with a physician performing a medical procedure, e.g., an ERCP procedure, and seeking to gain the benefits derived from the capabilities of the server system(s) 115.

In some embodiments, the components of the environment 100 may be associated with a common entity, e.g., a single business or organization, or, alternatively, one or more of the components may be associated with a different entity than another. The systems and devices of the environment 100 may communicate in any arrangement. For example, one or more user device(s) 105 and/or medical devices 110 may be associated with one or more clients or service subscribers, and server system(s) 115 may be associated with a service provider responsible for receiving procedural data from the one or more clients or service subscribers and thereafter utilizing the capabilities of the server system(s) 115 to return an output to the one or more clients or service subscribers. As will be discussed further herein, systems and/or devices of the environment 100 may communicate in order to generate, train, and/or utilize a machine-learning model to characterize aspects of a medical procedure and dynamically provide predictive navigational guidance, among other activities.

The user device 105 may be configured to enable the user to access and/or interact with other systems in the environment 100. For example, the user device 105 may be a computer system such as, for example, a desktop computer, a mobile device, a tablet, etc. In some embodiments, the user device 105 may include one or more electronic application(s), e.g., a program, plugin, browser extension, etc., installed on a memory of the user device 105.

The user device 105 may include a display user interface (UI) 105A, a processor 105B, a memory 105C, and a network interface 105D. The user device 105 may execute, by the processor 105B, an operating system (O/S) and at least one electronic application (each stored in memory 105C). The electronic application may be a desktop program, a browser program, a web client, or a mobile application program (which may also be a browser program in a mobile O/S), an applicant specific program, system control software, system monitoring software, software development tools, or the like. For example, environment 100 may extend information on a web client that may be accessed through a web browser. In some embodiments, the electronic application(s) may be associated with one or more of the other components in the environment 100. The application may manage the memory 105C, such as a database, to transmit medical procedure data to network 101. The display/UI 105A may be a touch screen or a display with other input systems (e.g., mouse, keyboard, etc.) so that the user(s) may interact with the application and/or the O/S. The network interface 105D may be a TCP/IP network interface for, e.g., Ethernet or wireless communications with the network 110. The processor 105B, while executing the application, may generate data and/or receive user inputs from the display/UI 105A and/or receive/transmit messages to the server system 115, and may further perform one or more operations prior to providing an output to the network 110.

The medical device(s) 110 in the environment 100 may include one or more medical devices (e.g., an endoscope, other internal imaging devices, etc.) integrally (e.g., via a wired connection, etc.) or operatively (e.g., via a wireless connection, etc.) coupled to the user device(s) 105 and/or the server system 115. Data obtained by sensors of the medical device(s) 110 (e.g., image/video data, position data, etc.) may be transmitted to one or both of the user device 105 and/or the server system 115.

In various embodiments, the network 101 may be a wide area network ("WAN"), a local area network ("LAN"), a personal area network ("PAN"), or the like. In some embodiments, network 101 includes the Internet, and information and data provided between various systems occurs online. "Online" may mean connecting to or accessing source data or information from a location remote from other devices or networks coupled to the Internet. Alternatively, "online" may refer to connecting or accessing a network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

The server system 115 may include an electronic data system, computer-readable memory such as a hard drive, flash drive, disk, etc. In some embodiments, the server system 115 includes and/or interacts with an application programming interface for exchanging data to other systems, e.g., one or more of the other components of the environment 100. The server system 115 may include and/or act as a repository or source for extracted raw dataset information.

The server system 115 may include a database 115A and at least one server 115B. The server system 115 may be a computer, system of computers (e.g., rack server(s)), and/or or a cloud service computer system. The server system may store or have access to database 115A (e.g., hosted on a third party server or in memory 115E). The server(s) may include a display/UI 115C, a processor 115D, a memory 115E, and/or a network interface 115F. The display/UI 115C may be a touch screen or a display with other input systems (e.g., mouse, keyboard, etc.) for an operator of the server 115B to control the functions of the server 115B. The server system 115 may execute, by the processor 115D, an operating system (O/S) and at least one instance of a servlet program (each stored in memory 115E). When user device 105 or medical device 110 sends medical procedure data to the server system 115, the received dataset and/or dataset information may be stored in memory 115E or database 115A. The network interface 115F may be a TCP/IP network interface for, e.g., Ethernet or wireless communications with the network 101.

The processor 115D may include and/or execute instructions to implement a predictive navigational guidance platform 120, which may include a medical procedure database 120A (e.g., containing data associated with historical ERCP procedures, etc.) and/or a navigational guidance model 120B. The medical procedure database 120A may be continually updated (e.g., with new medical procedure data). Additionally, the medical procedure database 120A may also be utilized to train the navigational guidance model 120B to dynamically identify, from data associated with an instant medical procedure, correlations between the characteristics associated with certain anatomical objects, the positioning of one or more components of a medical device, and/or the corresponding outcome of the procedure. The process by which these correlations may be identified is later described herein by the disclosure associated with FIG. 3.

In an embodiment, the medical procedure database 120A and the navigational guidance model 120B may both be contained within the predictive navigational guidance platform 120. Alternatively, one or both of these components may be subcomponents of other components within each other or may be resident on other components of the environment 100. For example, the medical procedure database 120A may be incorporated into an application platform on the user device 205 whereas the navigational guidance model 120B may be resident on the server 115B of the server system 115.

As discussed in further details below, the server system 115 may generate, store, train, or use one or more machine-learning models configured to analyze medical procedure data and provide predictive navigational guidance based on that analysis. The server system 115 may include one or more machine-learning models and/or instructions associated with each of the one or more machine-learning models, e.g., instructions for generating a machine-learning model, training the machine-learning model, using the machine-learning model, etc. The server system 115 may include instructions for retrieving output features, e.g., based on the output of the machine-learning model, and/or operating the displays 105A and/or 115C to generate one or more output features, e.g., as adjusted based on the machine-learning model.

The server system 115 may include one or more sets of training data. The training data may contain various types of historical data regarding a specific medical procedure, such as ERCP. For example, the training data may include characteristic information associated with various types of detected papilla (e.g., shape data, size data, orientation data, appearance data, etc.), orifice characteristic information (e.g., number, size, location, duct-association, etc.) associated with each of the detected papilla, anatomical information associated with the location and/or structure of a biliary and/or pancreatic duct, additional anatomic feature information associated with the detected papilla (e.g., presence or absence of intramural folds, oral protrusions, frenulum and/or sulcus, etc.), position of an endoscope with respect to the papilla before and/or during cannulation, historical ERCP procedure outcomes, and the like.

In some embodiments, a system or device other than the server system 115 may be used to generate and/or train the machine-learning model. For example, such a system may include instructions for generating the machine-learning model, the training data and ground truth, and/or instructions for training the machine-learning model. A resulting trained machine-learning model may then be provided to the server system 115.

In some embodiments, a machine-leaning model based on neural networks includes a set of variables, e.g., nodes, neurons, filters, etc., that are tuned, e.g., weighted or biased, to different values via the application of training data. In other embodiments, a machine learning model may be based on architectures such as support-vector machines, decision trees, random forests or Gradient Boosting Machines (GBMs). Alternate embodiments include using techniques such as transfer learning, wherein one or more pre-trained machine learning models on large common or domain specific dataset may be leveraged for analyzing the training data.

In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., compare the output of the trained model with the ground truth for that portion of the training data to evaluate an accuracy of the trained model. The training of the machine-learning model may be configured to cause the machine-learning model to learn contextual associations between the raw procedure data and the context with which it is associated with (e.g., which anatomical features and/or medical device actions affected the success rate of the ERCP procedure etc.), such that the trained machine-learning model is configured to provide predictive guidance that may increase the success rate of an ERCP procedure.

In various embodiments, the variables of a machine-learning model may be interrelated in any suitable arrangement in order to generate the output. For instance, in some embodiments, the machine-learning model may include signal processing architecture that is configured to identify, isolate, and/or extract features, patterns, and/or structure in an image or video. For example, the machine-learning model may include one or more convolutional neural networks ("CNN") configured to identify anatomical features associated with a papilla and related anatomical structures and may include further architecture, e.g., a connected layer, neural network, etc., configured to determine a relationship between the identified features and structures in order to determine an optimal cannulation path.

For example, in some embodiments, the machine-learning model of the server system 115 may include a Recurrent Neural Network ("RNN"). Generally, RNNs are a class of feed-forward neural networks that may be well adapted to processing a sequence of inputs. In some embodiments, the machine-learning model may include a Long Short Term Memory ("LSTM") model and/or Sequence to Sequence ("Seq2Seq") model. An LSTM model may be configured to generate an output from a sample that takes at least some previous samples and/or outputs into account. A Seq2Seq model may be configured to, for example, receive a sequence of images as input and thereafter generate a sequence of annotations and/or predictive medical device movement trajectories as output.

Although depicted as separate components in FIG. 1, a component or portion of a component in the environment 100 may, in some embodiments, be integrated with or incorporated into one or more other components. For example, a portion of the display 115C may be integrated into the user device 105 or the like. In some embodiments, operations or aspects of one or more of the components discussed above may be distributed amongst one or more other components. Any suitable arrangement and/or integration of the various systems and devices of the environment 100 may be used.

Training a Machine-Learning Model to Provide Predictive Navigational Guidance

Figure 2:
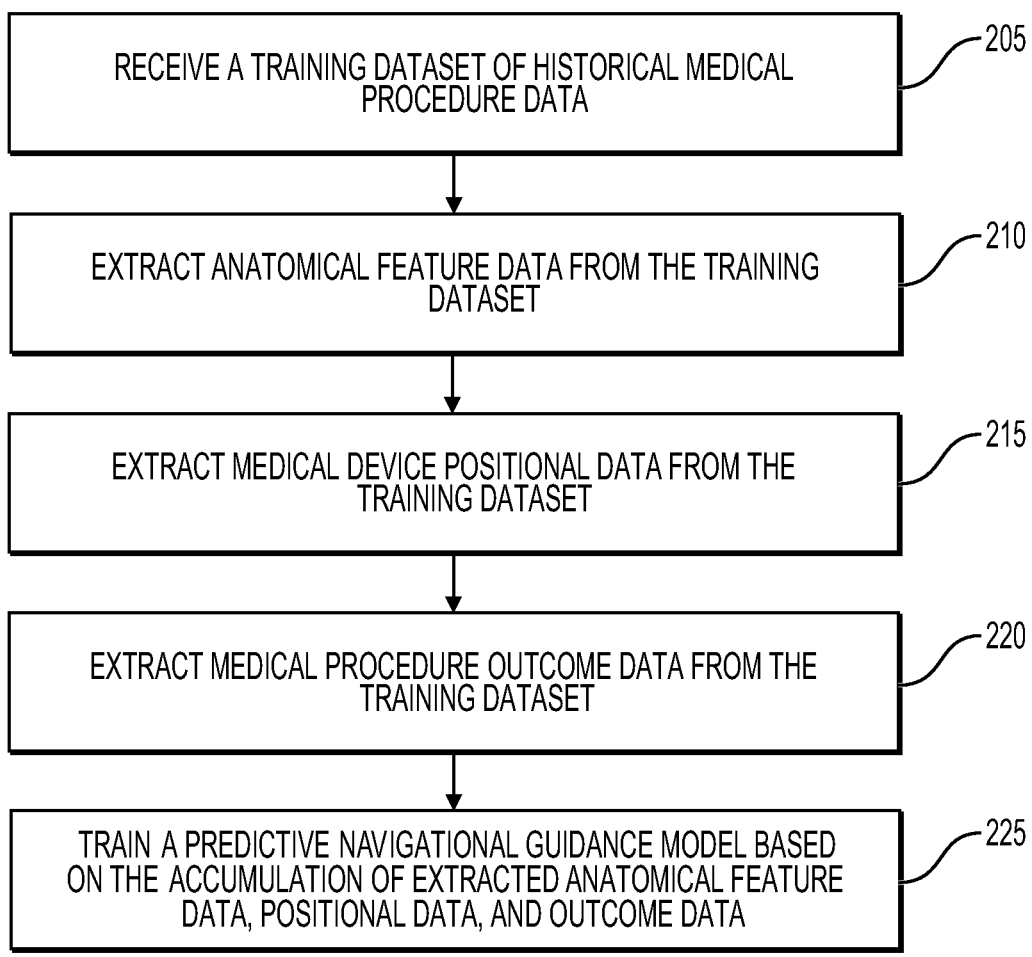
FIG. 2 depicts a flowchart of an exemplary method of training a machine-learning model to provide predictive navigational guidance during a medical procedure, according to one or more embodiments.

FIG. 2 illustrates an exemplary process for training a machine-learning model, such as a navigational guidance model 120B, to identify key anatomical features during an ERCP procedure and to provide dynamic guidance to aid an operating physician.

At step 205 of the training process, the method may include receiving a training dataset, e.g., a compilation of data associated with previously completed ERCP procedures. More particularly, for each completed ERCP procedure, the training data may include images, videos, medical reports, etc. associated with one or more anatomical objects of interest detected during previously completed ERCP procedures (e.g., a papilla, one or more orifices on the papilla, a biliary duct, a pancreatic duct etc.). This data may have been captured using one or more sensors associated with the medical device (e.g., an optical camera) and/or other imaging modalities (X-ray imaging, fluoroscopy, etc.). In an embodiment, the training data may also include position and/movement data of a medical device (e.g., an endoscope) and/or components thereof (e.g., a guidewire) in relation to one or more anatomical objects during the procedure. The position and/or movement data may have been captured using one or more other sensors (e.g., electromagnetic (EM) sensors, accelerometers, gyroscopes, fiber optics, ultrasound transducer, capacitive or inductive position sensors, etc.), and/or may have been obtained via any other suitable means, e.g., via observation by a person and/or automated system, via feedback of a controller for the medical device, etc. In an embodiment, the training data may also contain an indication of the outcome of each of the completed ERCP procedures (e.g., positive outcome, negative outcome, severity of negative outcome, etc.).

In an embodiment, each article of training data may be pre-annotated with relevant anatomical feature information. For example, each image of a papilla may identify one or more of: a classification associated with the papilla based on shape, orientation, and/or appearance data; orifice(s) on the papilla and their corresponding association (e.g., orifice associated with pancreatic duct, orifice associated with biliary duct, etc.); the orientation of each orifice (e.g., down-facing, side-facing, etc.); intramural ligament features (e.g., intramural folds), diverticulum, oral protrusions; frenulum and/or sulcus; and the like. In an embodiment, each article of training data may identify a path followed by a medical device to cannulate one or both of the orifices.

In an embodiment, a server system (e.g., server system 115) may receive the training dataset and may store the training dataset in a database (e.g., ERCP database 120A on the predictive navigational guidance platform 120, the database 115A, etc.) and/or in a memory (e.g., memory 115E). In an embodiment, a user may upload the training dataset to a user device (e.g., user device 105) to manually annotate each article of training data. The user device 105 may or may not store the training dataset in the memory (e.g., 105C). Once annotated, the user device 105 may transmit the annotated training dataset to the server system 115 via a network 101.

At step 210, the method may include, for each training dataset associated with an ERCP procedure, extracting anatomical feature data from the annotated training data. The extracted anatomical feature data may be used to train the machine-learning model to correctly identify and differentiate, during a live procedure, important anatomical objects relevant to the ERCP procedure. Additional disclosure relating to how the machine-learning model is trained off of the extracted anatomical feature data is further provided below in the discussion of FIG. 3.

Turning back to FIG. 2, at step 215, positional data associated with the recorded position, angle, and/or movements of an endoscope (and components thereof) with respect to a papilla during cannulation in the ERCP procedures in the training dataset may be extracted. This positional data may be originally acquired using one or more integrally or operatively coupled sensors to the endoscope and/or guidewire including, but not limited to, electromagnetic (EM) sensors, accelerometers, gyroscopes, fiber optics, ultrasound transducer, capacitive or inductive position sensors, etc.). In an embodiment, the positional data may be annotated with positive and/or negative annotations. For example, positional data that led to a successful procedure (e.g., resulting from an optimal position and/or angle of the endoscope with respect to the papilla, etc.) may be classified as positive whereas positional data that led to an unsuccessful procedure (e.g., due to an angle of approach, etc.) may be classified as negative. Accordingly, the predictive navigational guidance model may train on the accumulation of the positional data to identify the ideal positions, angles, and/or movements of the endoscope and guidewire to successfully cannulate the papilla.

At step 220, outcome data associated with the ERCP procedures in the training dataset may be extracted and utilized to train the predictive navigational guidance model. More particularly, each of the ERCP procedures in the training dataset may contain one or more indications of how successful or unsuccessful the ERCP procedure was. For the training dataset, the outcome data for each ERCP procedure may be explicitly annotated so that the predictive navigational guidance model may learn to dynamically distinguish between successful procedures and/or unsuccessful procedures and sub-steps thereof.

In an embodiment, the outcome data may provide a binary indication of the success state of the ERCP procedure (e.g., the ERCP procedure was overall successful or unsuccessful, etc.). In this regard, the success state of the ERCP procedure may be based on whether or not the biliary duct was successfully cannulated. Additionally or alternatively, in another embodiment, the outcome data may provide more granular indications of procedural outcomes occurring during the course of the ERCP procedure. More particularly, the outcome data may delineate the portions of the ERCP procedure that were successful (e.g., the biliary orifice and pancreatic orifice were successfully distinguished from one another) and unsuccessful (e.g., cannulation of the biliary duct was unsuccessful due to the approach angle of the guidewire, etc.).

At step 225, the accumulation of all the extracted data from steps 210-220 may be utilized to train the predictive navigational guidance model. In this regard, the trained predictive navigational guidance model may thereafter be able to receive data associated with a live ERCP procedure and apply the knowledge obtained from the training procedure to identify correlations between aspects of the live ERCP procedure and aspects associated with previously completed ERCP procedures (e.g., those embodied in the trained dataset, etc.). Thereafter, the predictive navigational guidance model may be able to provide dynamic guidance to an operator of the medical device (e.g., a physician, etc.), as further described herein.

Figure 3:
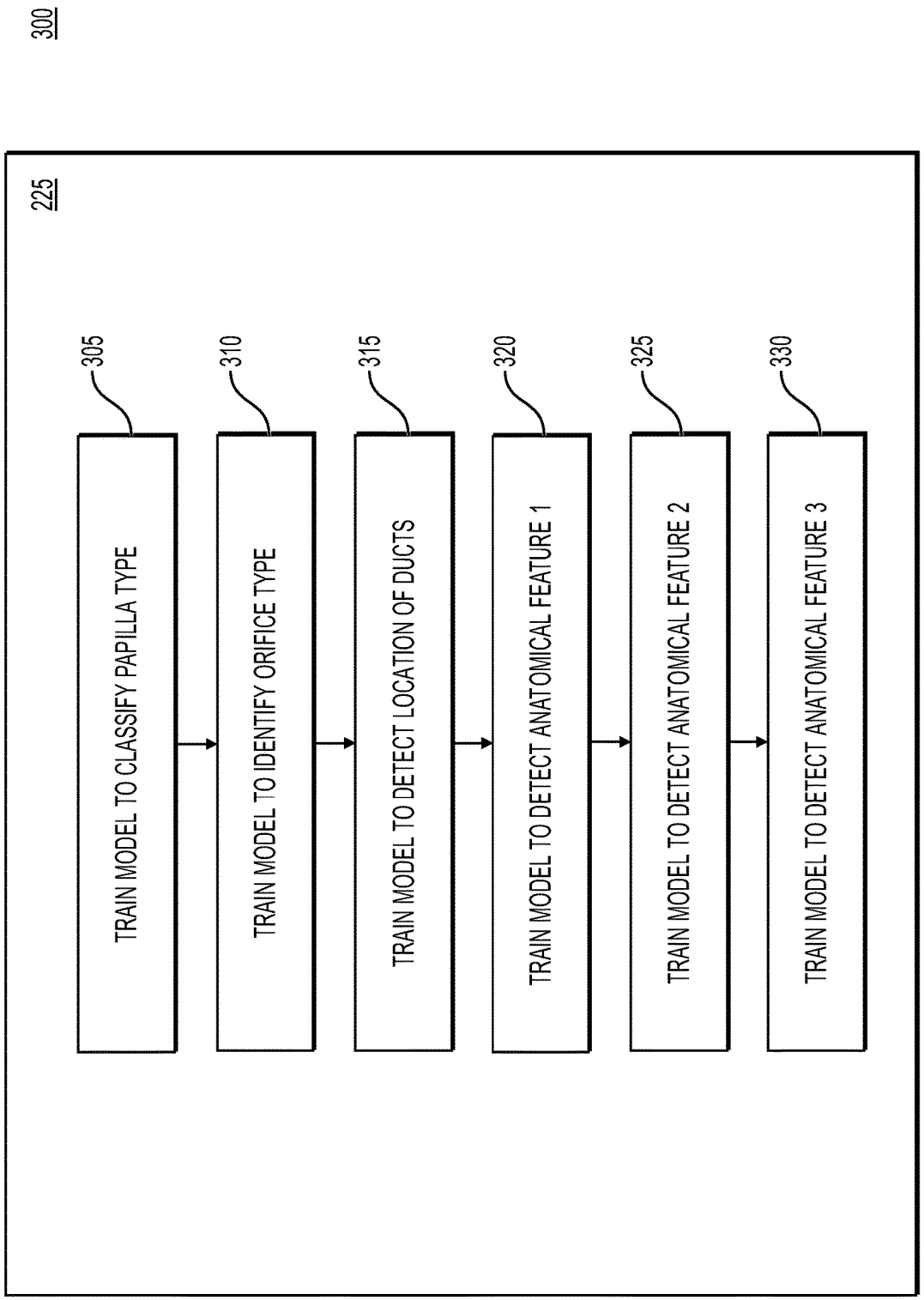
FIG. 3 depicts a flowchart of an exemplary method of training a machine-learning model to extract anatomical feature data, according to one or more embodiments.

FIG. 3 illustrates an exemplary process of extracting anatomical feature data from an annotated training dataset. More particularly, a combination of various visual AI neural network frameworks may be utilized to isolate and evaluate progressively smaller and/or more specific areas of a target image based on ROI and specific goals. Once trained, the predictive navigational guidance model 120B may be able to dynamically and accurately identify specific objects and ROIs from received data associated with a live ERCP procedure.

Figure 4:
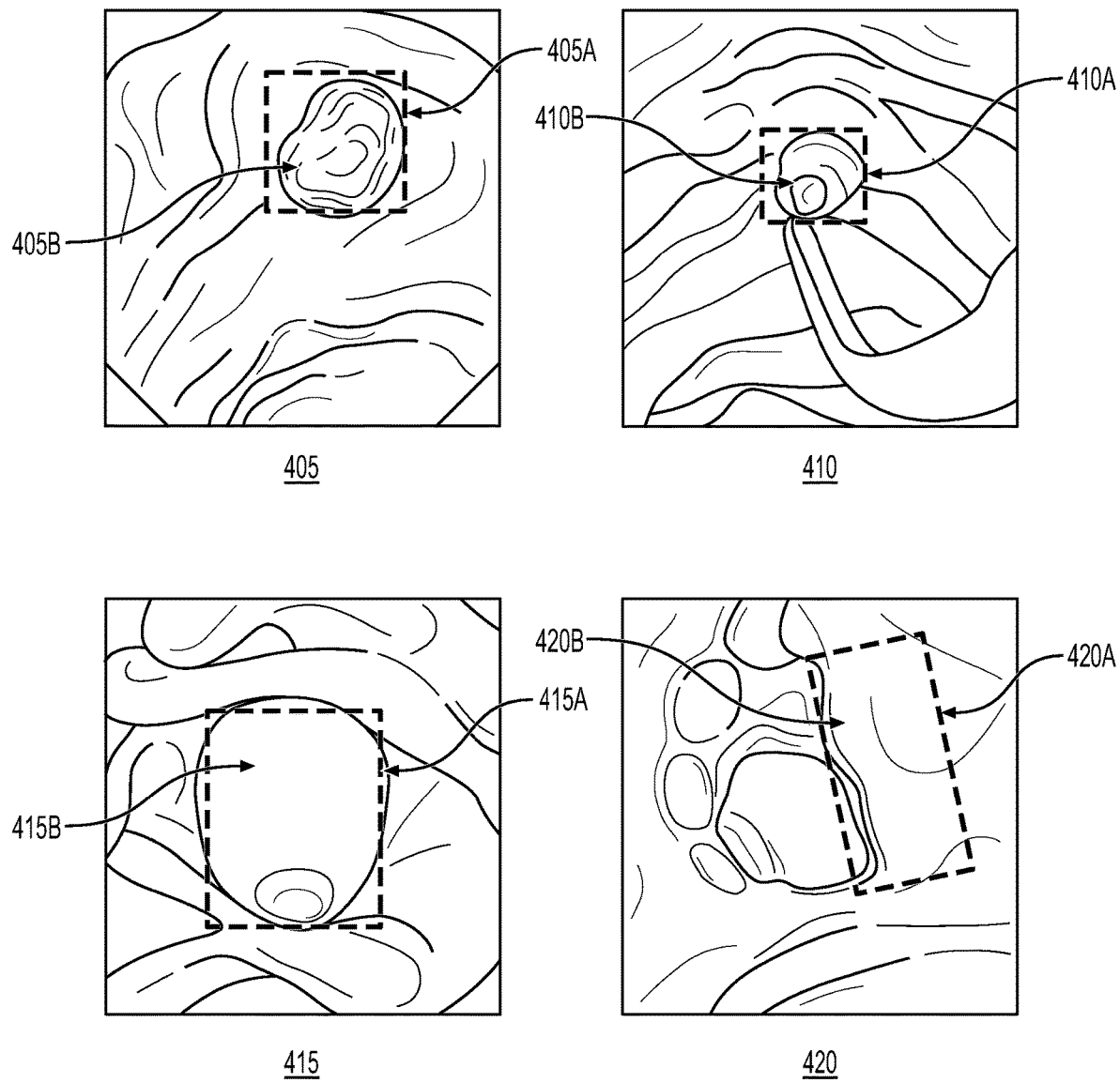
FIG. 4 depicts a plurality of views of different types of an anatomical object, according to one or more embodiments.

At step 305, the method may first include training the predictive navigational guidance model to classify a papilla type. Such a classification is important because the type of papilla present may dictate the location, orientation, and/or structure of other anatomical objects (e.g., orifices, etc.). Possible papilla types include: regular, small, protruding or pendulous, and creased or ridged. For example, with reference to FIG. 4, a plurality of potential papilla types are illustrated. For instance, with respect to papilla 405, ROI 405A includes a "regular" papilla 405B, i.e., one that contains no distinctive features and has a "classic" appearance. With respect to papilla 410, ROi 410A includes a "small" papilla 410B, i.e., one that is often flat, with a diameter less than or equal to 3 millimeters. With respect to papilla 415, ROI 415A may include a protruding or pendulous papilla 415B, i.e., one that may stand out, protrude, or bulge into the duodenal lumen or sometimes hang down and may be pendulous in appearance with the orifice oriented caudally. With respect to papilla 420, ROI 420A may include a creased or ridged papilla 420B, i.e., one in which the ductal mucosa appears to extend distally out of the papillary orifice either on a ridge or in a crease.

In an embodiment, each set of annotated training data may contain an explicit designation of the ROI as well as an explicit indication of the papilla type. In an embodiment, each image in the training set may generally be captured with an "en face" alignment to the target papilla. In an embodiment, for step 305, a regional convolution neural network (R-CNN) framework, e.g., RESNET-18, may be employed and trained on a high batch volume of annotated images of papilla types to facilitate proper papilla type classification during a live ERCP procedure.

Figure 5:
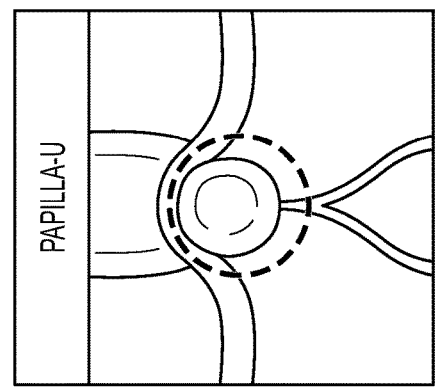
FIG. 5 depicts a plurality of views of different characteristic patterns of an anatomical object, according to one or more embodiments.
Figure 5:
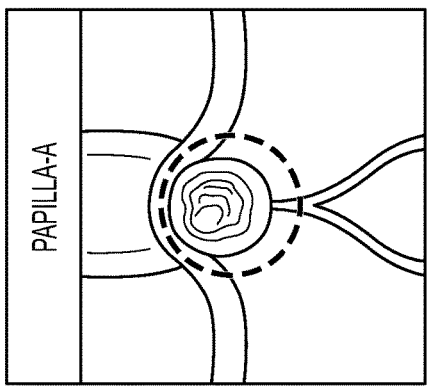
Figure 5:
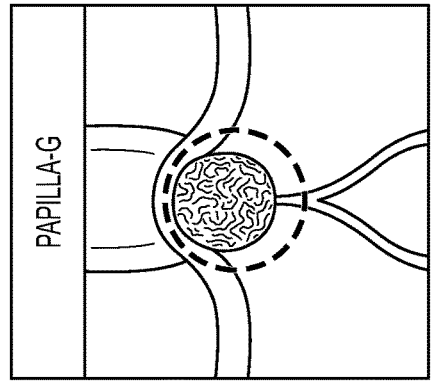
Figure 5:
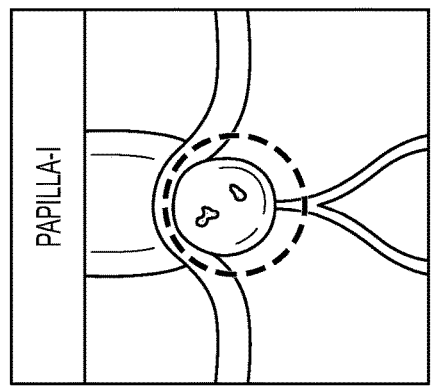
Figure 5:
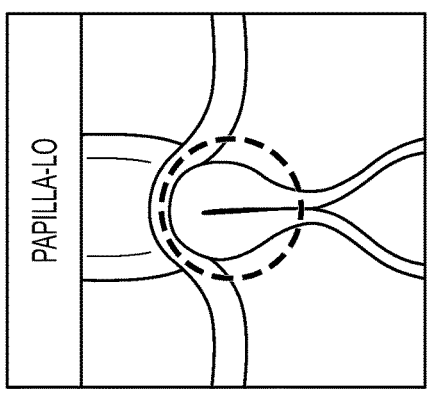

At step 310, the method may include training the predictive navigational guidance model to identify an orifice type. More particularly, in an embodiment, the predictive navigational guidance model may be trained to identify a second ROI (i.e., ROI-2), bounded by the first ROI (i.e., ROI-1), which is associated with a particular papilla pattern. The type of papilla pattern identified may correspondingly dictate the characteristics of one or more orifices resident on the papilla. Turning now to FIG. 5, a plurality of known papilla patterns are illustrated. For example, Papilla-A 505 may correspond to a typical papilla pattern with an annular shape, with some having nodular changes at the oral side of the center. Papilla-U 510 may correspond to a papilla pattern that may be generally unstructured without a clear orifice. Papilla-LO 515 may correspond to a papilla pattern having longitudinal grooves continuous with the orifice, with the length of the grooves being longer than a transverse diameter of the biliary duct axis of the papilla. Papilla-I 520 may correspond to a papilla pattern have two separate, isolated orifices of the biliary and pancreatic ducts, with the opening on the oral side being that of the biliary duct and that on the anal side being that of the pancreatic duct. Papilla-G 525 may correspond to a papilla pattern having a gyrate structure.

In an embodiment, each set of annotated training data may contain one or more explicit designations that identify: the type of papilla pattern expressed by the papilla, the region on the papilla where one or more orifices are located based on the papilla pattern, and the type of access the orifice may present. In an embodiment, as a result of the smaller focus area of ROI-2 compared to ROI-1, fewer convolutions may be needed to accurately classify the orifice type. Accordingly, for step 310, a Fast R-CNN framework, e.g., RESTNET-9 or other faster conventional R-CNNs, may be employed and trained on a high batch volume of annotated papilla patterns and corresponding orifice characteristics.

Figure 6:
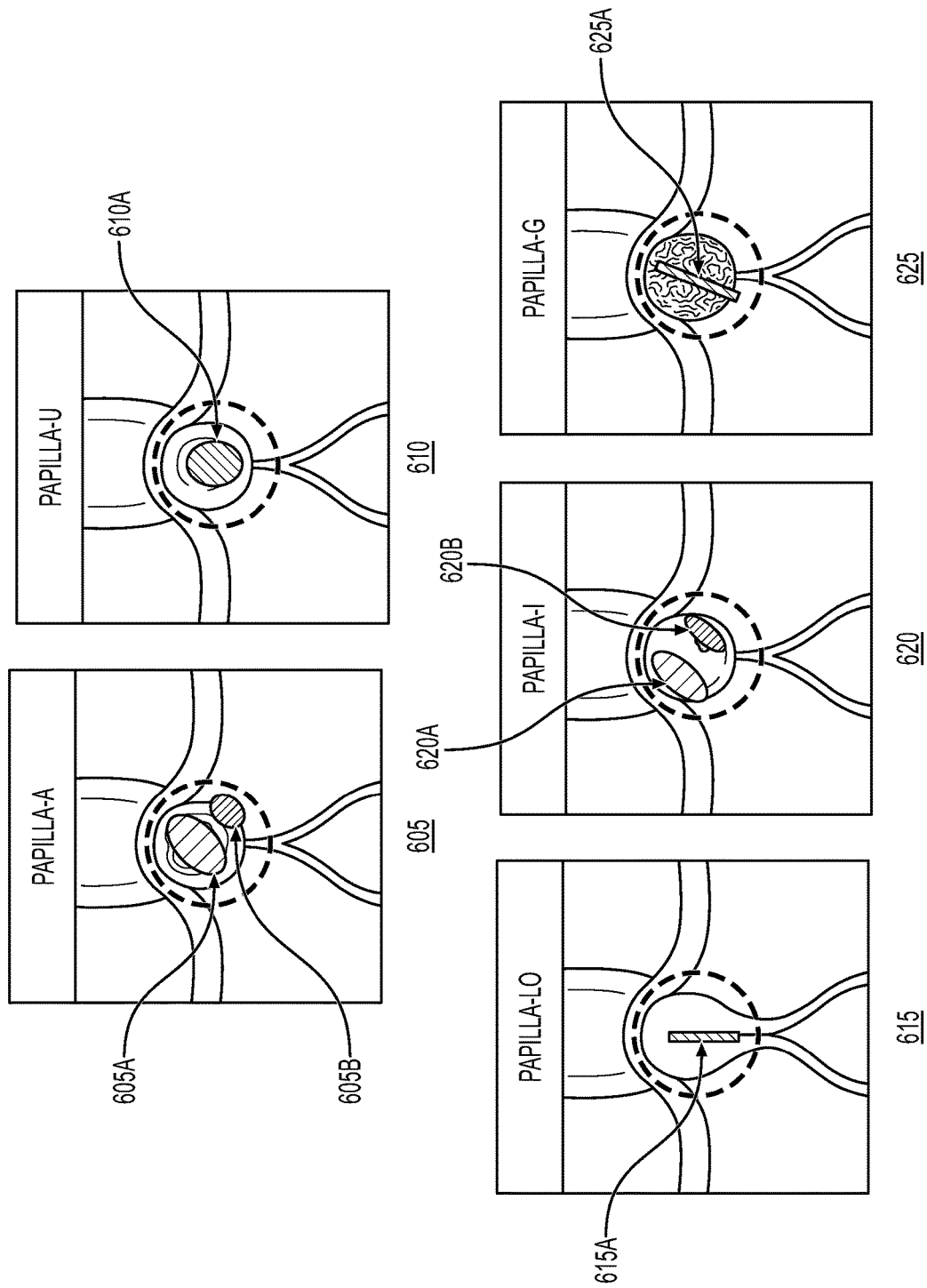
FIG. 6 depicts a plurality of views of anatomical object differentiation based on the characteristic patterns of an anatomical object, according to one or more embodiments.

At step 315, the method may include training the predictive navigational guidance model to detect the location of the biliary and/or pancreatic ducts. More particularly, in an embodiment, the biliary and/or pancreatic ducts may be located on the image and, if possible, distinguished from each other and/or other anatomical objects (e.g., based on annotations in the training data). Turning now to FIG. 6, non-limiting examples are provided of situations where the biliary and/or pancreatic ducts may be explicitly delineated on each of the images from FIG. 5. For example, Papilla 605 illustrates locations of both the biliary duct 605A and pancreatic duct 605B, Papilla 610 illustrates the location of the biliary duct 610A, Papilla 615 illustrates the location of the biliary duct 615A, Papilla 620 illustrates the locations of both the biliary duct 620A and pancreatic duct 620B, and Papilla 625 illustrates the location of the biliary duct 625A.

In an embodiment, duct differentiation may be accomplished using a semantic segmentation model (e.g., SegNet) that may employ a full convolutional network on just the region bounded by ROI-2. Such a model may utilize a two stage approach to first distinguish the ducts from the surrounding anatomical features found on the papilla and thereafter may perform regression to differentiate the ducts from one another. In an embodiment, the full convolutional network may be trained using a high volume of annotated images delineating the identity of the biliary and/or pancreatic ducts.

At steps 320-330, one or more detection algorithms may be leveraged to identify specific anatomical features on, or associated with, the papilla. For example, at step 320, a detection algorithm may be trained to determine if any intramural folds exist. At step 325, subsequent to, or independent from, the detection training process performed at step 320, the same or different detection algorithm may be trained to determine if oral protrusions exist. At step 330, subsequent to, or independent from, the detection process performed at steps 320 and 325, the same or different detection algorithm may be trained to determine if a frenulum and/or a sulcus are present. To train the detection algorithms at each of steps 320-330 to be primed to detect the specific anatomical feature(s) associated with each step, the training dataset may be annotated with the relevant anatomical objects.

Figure 7:
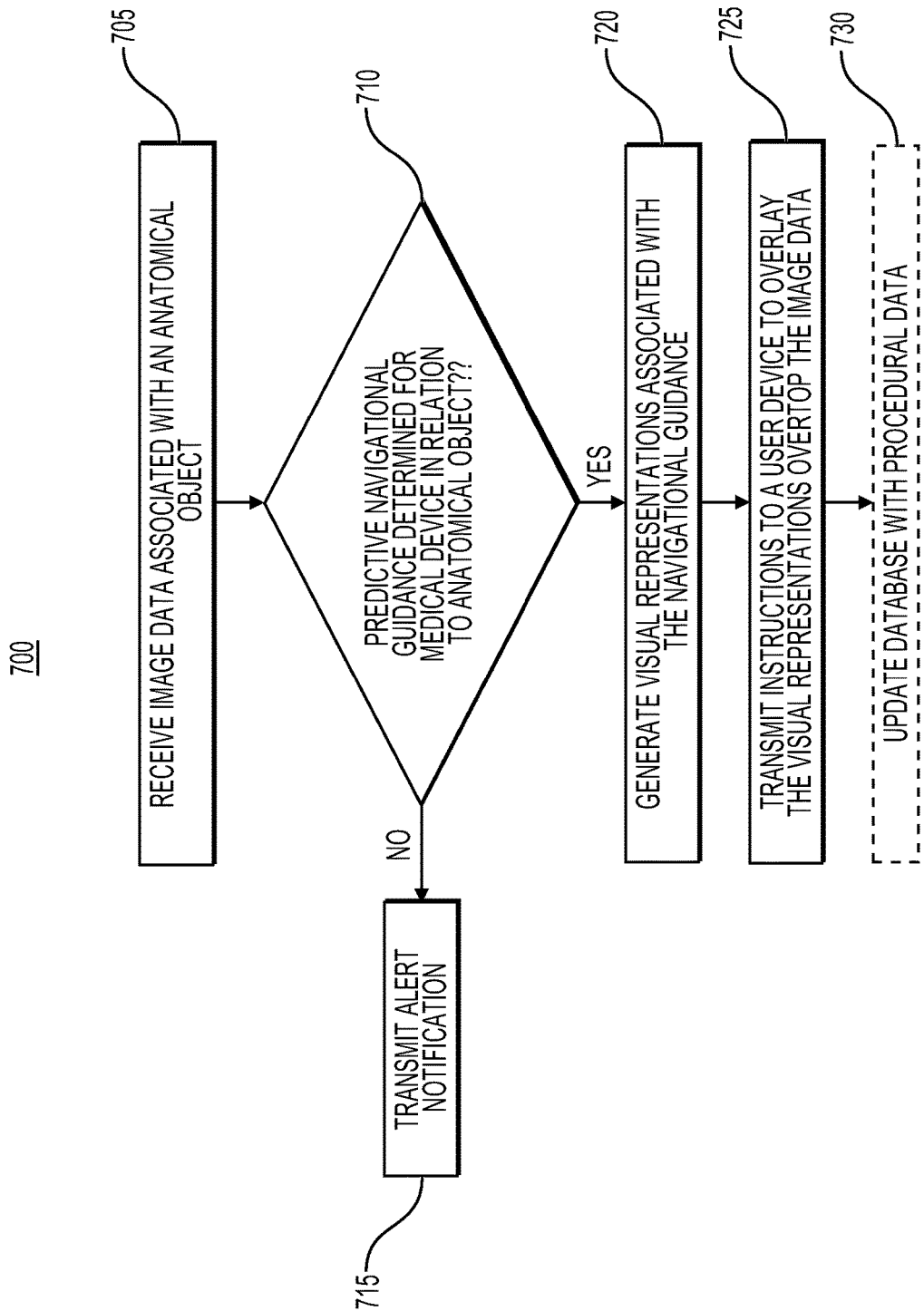
FIG. 7 depicts a flowchart of an exemplary method of providing predictive navigational guidance during a medical procedure using a trained machine-learning model, according to one or more embodiments.

Applying the Trained Machine-Learning Model to Live Procedure Data to Generate Predictive Navigational Guidance FIG. 7 illustrates an exemplary process for determining predictive navigational guidance for an ERCP procedure and thereafter providing the guidance to an operating physician.

At step 705, an embodiment of the trained predictive navigational model may receive image data associated with one or more anatomical objects associated with a live ERCP procedure. For example, the one or more anatomical objects may correspond to a papilla, one or more orifices resident on the papilla, a biliary and/or pancreatic duct, other anatomical features or structures associated with any of the foregoing, and the like. In an embodiment, the image data may be captured by one or more optical sensors of a medical device utilized in the ERCP procedure. For example, the image data may be captured by one or more optical sensors positioned on a distal end of an endoscope.

At step 710, an embodiment of the trained predictive navigational guidance model may determine predictive navigational guidance for the medical device utilized in the medical procedure in relation to a target anatomical object. In this regard, an embodiment may apply the image data as input to a trained predictive navigational guidance model. The trained predictive navigational guidance model may be configured to analyze aspects of the image data to determine relevant correlations between historical ERCP procedures and the live ERCP procedure. Additionally, in some embodiments, available position data associated with the medical device may also be provided as input to the trained model.

Responsive to determining, at step 710, one or more types of predictive navigational guidance cannot be determined (e.g., due to lack of necessary information, an inability of a machine-learning model to identify correlations between live procedure data and historical procedure data, etc.), an embodiment may, at step 715, transmit an alert notification (e.g., to the user device 105). The alert notification may be an audio notification, a visual notification, or a combination thereof and may contain an explanation indicating why no dynamic guidance could be provided. Alternatively, in another embodiment, no additional action may be taken.

Conversely to the foregoing, responsive to determining, at step 710, one or more types of predictive navigational guidance, an embodiment may, at step 720, generate one or more visual representations associated with the determined predictive navigational guidance. In an embodiment, the one or more visual representations may correspond to one or more: annotations identifying relevant anatomical objects, trajectory recommendations for maneuvering the medical device and/or components thereof, and/or feedback notifications alerting a medical device operator to updates occurring in the medical procedure.

Figure 8:
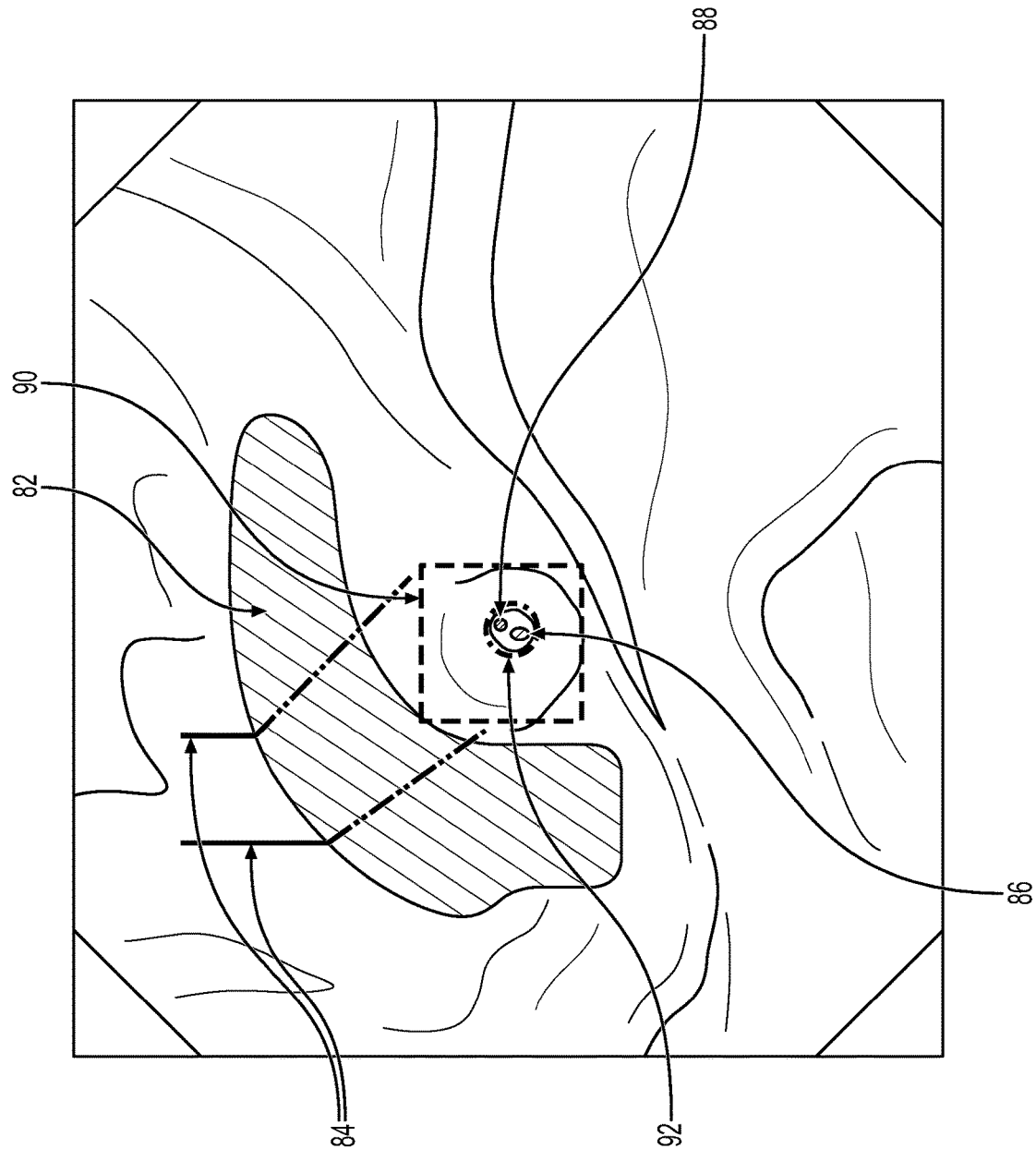
FIG. 8 depicts an illustration of annotated-based predictive guidance, according to one or more embodiments.

At step 725, an embodiment may transmit instructions to a user device to display/overlay the visual representations of the predictive guidance overtop some or all portions of the image data. For example, in an embodiment, the server system 115 may be configured to transmit instructions to the user device to annotate one or more relevant anatomical objects during the medical procedure. In an embodiment, potential annotations may include anatomical object coloring/highlighting (e.g., where each detected relevant anatomical object is colored a different specific color, etc.), ROI designation (e.g., where relevant zones in the image data are delineated via a target box or outline, etc.), text identifiers (e.g., where each detected relevant anatomical object is textually identified, etc.), a combination thereof, and the like. Turning now to FIG. 8, a non-limiting example of annotations overlaid atop image data associated with a target papilla is provided. The annotations present in FIG. 8 include visually distinguished anatomical objects (e.g., an intramural segment/Diverticulum 82 may be colored in blue, an intramural biliary duct 84 may be colored in grey, a biliary duct orifice 86 may be colored in green, and a pancreatic duct orifice 88 may be colored in red) as well as ROI designations (e.g., a papilla identifier box 90 and an orifice region outline 92).

Figure 9:
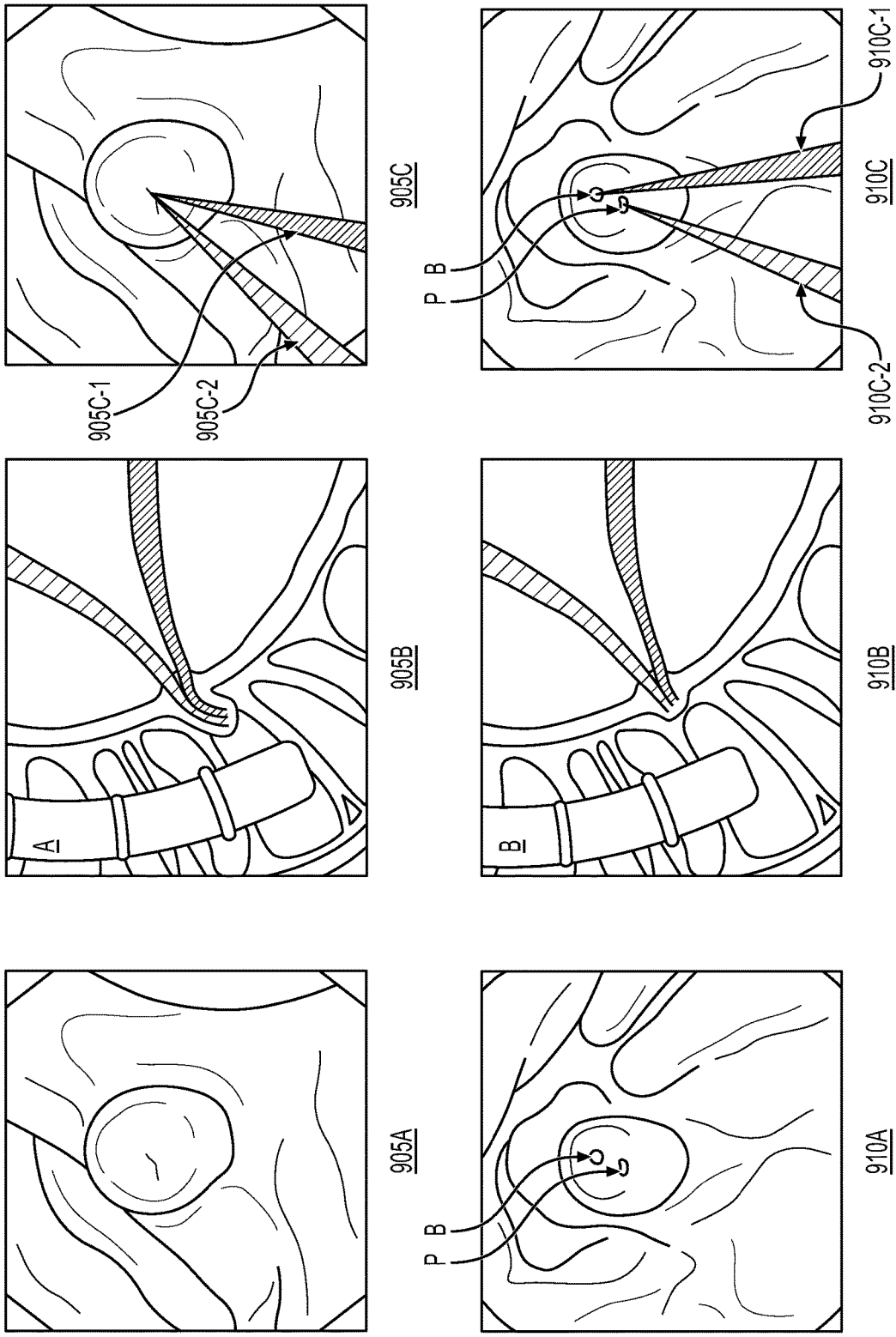
FIG. 9 depicts an illustration of trajectory-based predictive guidance, according to one or more embodiments.

In another embodiment, the server system 115 may be configured to transmit instructions to the user device to provide a recommended trajectory to help position, align, and/or advance the ERCP scope and guidewire. In an embodiment, the recommended trajectory may be provided as an overlay atop the image data of the anatomical object(s). For example, with reference to FIG. 9, a non-limiting example implementation of how a trajectory overlay may be implemented in two different procedural situations is provided. In FIG. 9, a traditional endoscopic view of two papillas, i.e., 905A and 910A, is provided. Each papilla contains a distinct papilla pattern that influences the orifice location of the biliary and pancreatic duct. More particularly, the positioning of the ducts and corresponding orifices may vary between the two papillas illustrated in 905A and 910A. These differences may be represented in diagrams 905B and 910B. Specifically, it can be seen that both the biliary and pancreatic ducts are accessible via a single orifice in the papilla illustrated in 905A, whereas the biliary and pancreatic ducts may be accessible via a dedicated orifice in the papilla illustrated in 910A. Based on learned knowledge, the predictive navigational guidance model may be able to identify the proper duct locations for each papilla type and thereafter provide a recommended trajectory overlay for access to the target duct, as illustrated in 905C and 910C. More particularly, with reference to 905C, despite the biliary and pancreatic ducts being accessible through a single orifice, the trajectory overlay may still provide, at 905C-1, an approach trajectory to cannulate the biliary duct and/or, at 905C-2, an approach trajectory to cannulate the pancreatic duct. Additionally, with reference to 910C, the predictive navigational guidance model may be able to differentiate between the two identified orifices and thereafter provide, at 910C-1, an approach trajectory to cannulate the biliary duct and/or, at 910C-2, an approach trajectory to cannulate the pancreatic duct.

In another embodiment, the server system 115 may be configured to transmit instructions to the user device to provide feedback to the physician when the movement of the endoscope and/or the guidewire strays from the recommended trajectory. In an embodiment, the server system 115 may be configured to provide feedback immediately (e.g., when departure from the recommended trajectory is initially detected) or, alternatively, when the degree of departure from the recommended trajectory exceeds a predetermined threshold. In an embodiment, the feedback may manifest in one or more different forms. For example, the feedback may manifest as a visual alert (e.g., a text alert, icon alert, animation alert, etc., presented on a display screen of a user device, etc.), an auditory alert (e.g., provided via one or more speakers associated with the user device, etc.), a haptic alert (e.g., vibration of the medical device via one or more actuators, etc.), or a combination thereof. In an embodiment, the feedback may be presented only once, at predetermined intervals (e.g., every 5 seconds, 10 seconds, etc.), or continuously. In an embodiment, the feedback may be instructive and may suggest adjustments that the medical device operator may make to align a projected approach path with the recommended trajectory.

In an embodiment, the server system 115 may be configured to not transmit any predictive navigational guidance unless a confidence weight of the predictive navigational guidance model with respect to a target anatomical object is greater than a predetermined threshold. More particularly, a confidence weight held by the predictive navigational guidance model for a particular anatomical object (e.g., a papilla) may first be identified. The confidence weight may be based on, or reflected by, the training the predictive navigational guidance model has had with a specific anatomical object (e.g., a specific type of papilla or papilla pattern, etc.), wherein greater training may correspond to higher confidence. An embodiment may then determine whether this confidence weight is greater than a predetermined confidence threshold and, responsive to determining that it is not, may withhold transmitting predictive guidance to a medical device operator.

Returning to FIG. 7, at 730, an embodiment may optionally update the ERCP database with data associated with the live medical procedure. This update data may subsequently be used to further train the predictive navigational guidance model (e.g., using the processes previously described in FIGS. 2-3). In an embodiment, the types of data obtained from the live medical procedure that may be utilized to update the ERCP database may include one or more of: captured anatomical feature data, detected medical device position/movement data, medical procedure outcome data (e.g., was overall cannulation successful or unsuccessful, which parts of the ERCP procedure were successful or unsuccessful, were there any post-procedure complications such as pancreatitis, etc.), navigational guidance accuracy data (e.g., how accurate was an annotation for identifying an anatomical object, how accurate was a recommended trajectory, etc.), and the like. In one embodiment, the update to the ERCP database may be a single, batched update. For example, an embodiment may hold all of the captured data associated with the medical procedure until it is complete. Thereafter, an embodiment may transmit all data associated with the medical procedure to the ERCP database. Alternatively, in another embodiment, the ERCP database may be updated with medical procedure data continuously (e.g., as the data is accumulated). For example, an embodiment may transmit image data associated with a target anatomical object to the ERCP database substantially immediately when it is captured, an embodiment may continuously transmit movement data associated with a medical device during the medical procedure to the ERCP database substantially immediately once it is detected, etc.

Figure 10:
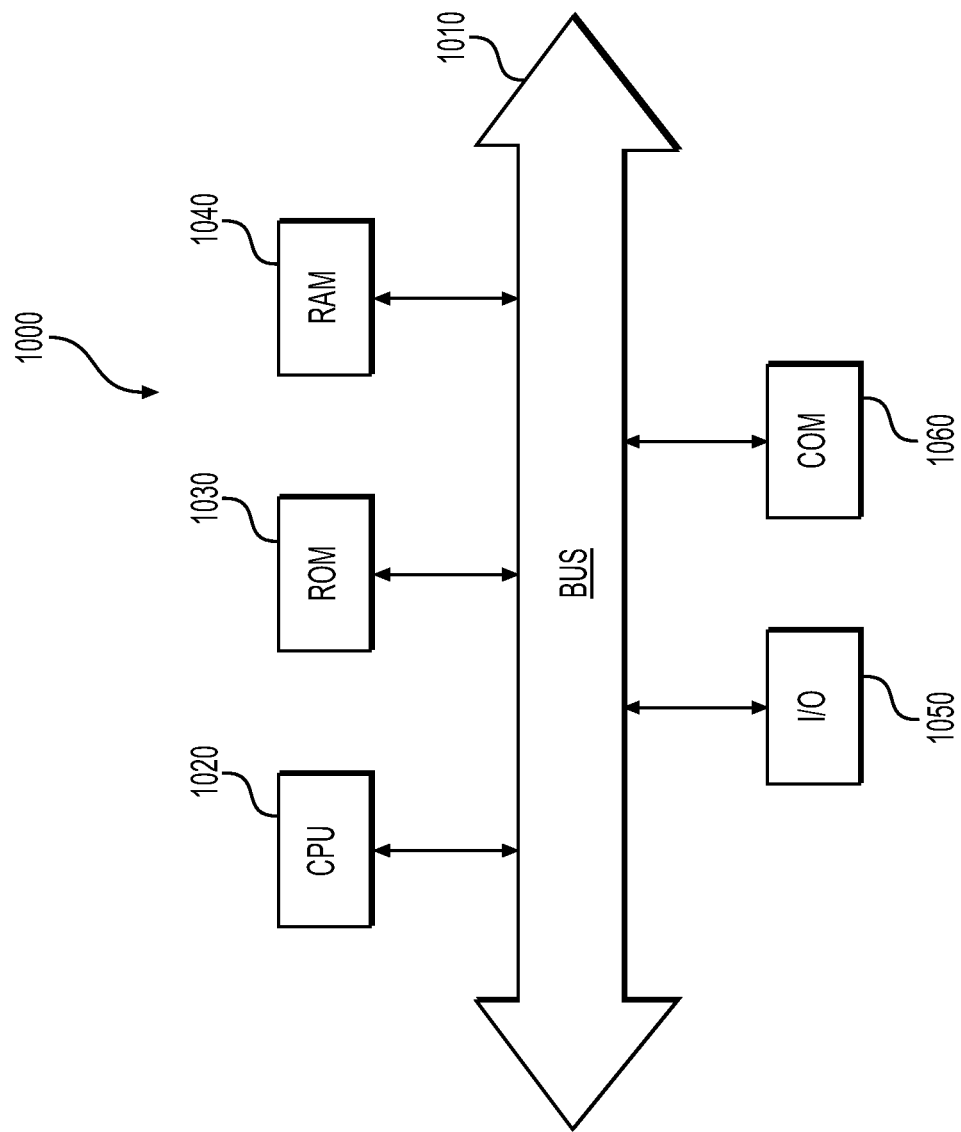
FIG. 10 depicts an example of a computing device, according to one or more embodiments.

FIG. 10 is a simplified functional block diagram of a computer 1100 that may be configured as a device for executing the methods of FIGS. 2-3, and 7, according to exemplary embodiments of the present disclosure. For example, device 1000 may include a central processing unit (CPU) 1020. CPU 1020 may be any type of processor device including, for example, any type of special purpose or a general-purpose microprocessor device. As will be appreciated by persons skilled in the relevant art, CPU 1020 also may be a single processor in a multi-core/multiprocessor system, such system operating alone, or in a cluster of computing devices operating in a cluster or server farm. CPU 1020 may be connected to a data communication infrastructure 1010, for example, a bus, message queue, network, or multi-core message-passing scheme.

Device 1000 also may include a main memory 1040, for example, random access memory (RAM), and also may include a secondary memory 1030. Secondary memory 1030, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1030 may include other similar means for allowing computer programs or other instructions to be loaded into device 1000. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1000.

Device 1000 also may include a communications interface ("COM") 1060. Communications interface 1060 allows software and data to be transferred between device 1000 and external devices. Communications interface 1060 may include a modem, a network interface (such as an Ethernet card), a communications port, a PCMCIA slot and card, or the like. Software and data transferred via communications interface 1060 may be in the form of signals, which may be electronic, electromagnetic, optical, or other signals capable of being received by communications interface 1060. These signals may be provided to communications interface 1060 via a communications path of device 1000, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 1000 also may include input and output ports 1050 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

We claim:

1. A computer-implemented method for generating navigational guidance for a medical device within a body, the computer-implemented method comprising:
    receiving, at a computer server, image data including a first anatomical object;
    determining, using a processor associated with the computer server and via application of a trained predictive navigational guidance model to the image data, navigational guidance for the medical device in relation to the first anatomical object by:
        identifying, within a first target region of the image data including the first anatomical object, a first classification associated with the first anatomical object indicating a type, from a plurality of types, of the first anatomical object;
        identifying, from within a second target region bounded by the first target region, a second classification associated with a feature of the first anatomical object indicating characteristics of the feature; and
        detecting, from within the second target region, a location of a second anatomical object not visible in the image data,
        wherein the navigational guidance is associated with accessing the second anatomical object determined based on the first classification, the second classification, and the location;
    generating, based on navigational guidance, at least one visual representation visualizing the accessing of the second anatomical object not visible in the image data; and
    transmitting, to a user device in network communication with the computer server, instructions to cause the user device to display the at least one visual representation overtop of the image data on a display screen of the user device.

2. The computer-implemented method of claim 1, wherein the medical device is an endoscope comprising an extendable guide wire.

3. The computer-implemented method of claim 1, wherein the first anatomical object is a papilla, the feature of the first anatomical object is an orifice, the second anatomical object is an internal duct, and the navigational guidance includes a path for the medical device for cannulation of the first anatomical object via the feature to access the second anatomical object.

4. The computer-implemented method of claim 1, wherein the image data is captured by at least one sensor associated with the medical device and/or by at least one other imaging device.

5. The computer-implemented method of claim 4, wherein the at least one sensor associated with the medical device comprises a camera sensor, and wherein the image data captured by the camera sensor comprises at least one of: shape data, orientation data, and/or appearance data of the first anatomical object.

6. The computer-implemented method of claim 4, wherein the at least one other imaging device comprises an X-ray device and/or an ultrasound device, and wherein the image data captured by the at least one other imaging device comprises anatomical structure data.

7. The computer-implemented method of claim 1, further comprising receiving position data captured by one or more other sensors associated with the medical device, wherein the one or more other sensors comprise at least one of: an electromagnetic sensor, an accelerometer, a gyroscope, a fiber optic sensor, an ultrasound transducer, a capacitive position sensor, or an inductive position sensor.

8. The computer-implemented method of claim 1, wherein the determining the navigational guidance comprises detecting one or more other features associated with the first anatomical object, the one or more other features including intramural folds, oral protrusions, a frenulum, or sulcus, wherein the navigational guidance is determined further based on the one or more other features.

9. The computer-implemented method of claim 1, wherein:
the type of the first anatomical object indicated by the first classification associated with the first anatomical object is a papilla type of a papilla of the at least one anatomical object;
the characteristics of the feature of the first anatomical object indicated by the second classification include a papilla pattern corresponding to an orifice type of an orifice of the papilla; and
the location of the second anatomical object detected is a location of a biliary duct or a location of a pancreatic duct.

10. The computer-implemented method of claim 1, wherein the determining comprises:
identifying a confidence weight held by the trained predictive navigational guidance model for the first anatomical object; and
determining whether that confidence weight is greater than a predetermined confidence threshold;
wherein the generating of the navigational guidance is only performed in response to determining that the confidence weight is greater than the predetermined confidence threshold.

11. The computer-implemented method of claim 1, wherein the at least one visual representation comprises one or more of: at least one trajectory overlay, at least one annotation, and/or at least one feedback notification.

12. The computer-implemented method of claim 11, wherein the at least one trajectory overlay includes a visual indication, overlaid on top of the image data including the first anatomical object, of a projected path to an access point associated with the feature of the first anatomical object that a component of the medical device follows to cannulate the first anatomical object to access the second anatomical object.

13. The computer-implemented method of claim 12, further comprising:
receiving, at the computer server, position data for the medical device; and
identifying, based on analysis of the received position data, deviation of the medical device from the projected path;
wherein the generating the at least one feedback notification comprises generating responsive to detecting that the deviation of the medical device from the projected path is greater than a predetermined amount.

14. The computer-implemented method of claim 11, wherein the at least one annotation comprises one or more visual indications, overlaid on top of the image data including the first anatomical object, indicating predetermined features associated with the first anatomical object.

15. The computer-implemented method of claim 14, wherein the one or more visual indications comprise one or more of: a color indication, an outline indication, and/or a text-based indication.

16. A computer system for generating navigational guidance for a medical device within a body, the computer system comprising:
at least one memory storing instructions; and
at least one processor configured to execute the instructions to perform operations comprising:
receiving image data including a first anatomical object;
determining, using the at least one processor and via application of a trained predictive navigational guidance model to the image data, navigational guidance for the medical device in relation to the first anatomical object by:
identifying, within a first target region of the image data including the first anatomical object, a first classification associated with the first anatomical object indicating a type, from a plurality of types, of the first anatomical object;
identifying, from within a second target region bounded by the first target region, a second classification associated with a feature of the first anatomical object indicating characteristics of the feature; and
detecting, from within the second target region, a location of a second anatomical object not visible in the image data,
wherein the navigational guidance is associated with accessing the second anatomical object determined based on the first classification, the second classification, and the location;
generating, based on the navigational guidance, at least one visual representation visualizing the accessing of the second anatomical object not visible in the image data; and
transmitting, to a user device, instructions to cause the user device to display the at least one visual representation overtop of the image data on a display screen of the user device.

17. The computer system of claim 16, wherein the image data including the first anatomical object is first image data of a target area captured by and received from the medical device within the body, and the operations further comprise:
receiving second image data of a different imaging modality comprising anatomical structure data associated with the target area, wherein the trained predictive navigational guidance model is applied to the first image data and the second image data to determine the navigational guidance.

18. A medical system comprising:
a medical device comprising an imaging device configured to capture image data of a target area within a body, the target area including a first anatomical object; and
a computing device communicatively coupled to the medical device and a display device, the computing device comprising:
at least one memory storing instructions; and
at least one processor configured to execute the instructions to perform operations comprising:
receiving, from the medical device, image data of the first anatomical object captured by the imaging device;
applying a trained predictive navigational guidance model to the image data to determine navigational guidance for the medical device in relation to the first anatomical object by:
identifying, within a first target region of the image data including the first anatomical object, a first classification associated with the first anatomical object indicating a type, from a plurality of types, of the first anatomical object;
identifying, from within a second target region bounded by the first target region, a second classification associated with a feature of the first anatomical object indicating characteristics of the feature; and
detecting, from within the second target region, a location of a second anatomical object not visible in the image data,
wherein the navigational guidance is associated with accessing the second anatomical object determined based on the first classification, the second classification, and the location;
generating, based on the navigational guidance, at least one visual representation visualizing the accessing of the second anatomical object not visible in the image data; and
causing the display device to display the at least one visual representation overlaid on the image data.

19. The medical system of claim 18, wherein image data of the first anatomical object captured by the imaging device of the medical device is first image data, and the operations further comprise:
receiving second image data of a different imaging modality comprising anatomical structure data associated with the target area, wherein the trained predictive navigational guidance model is applied to the first image data and the second image data to determine the navigational guidance.

20. The medical system of claim 18, wherein:
the first anatomical object provides a common entry point for accessing a plurality of anatomical objects, including the second anatomical object, and
the navigational guidance includes a path for the medical device for cannulation of the first anatomical object to access the second anatomical object.

* * * * *